(12) United States Patent
Liu

(10) Patent No.: US 8,275,877 B2
(45) Date of Patent: Sep. 25, 2012

(54) METHOD AND SYSTEM FOR MAKING STATISTICS OF MEDIA FLOW INFORMATION IN A NEXT GENERATION NETWORK

(75) Inventor: Enhui Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 505 days.

(21) Appl. No.: 11/674,451

(22) Filed: Feb. 13, 2007

(65) Prior Publication Data

US 2007/0156921 A1  Jul. 5, 2007

Related U.S. Application Data

(63) Continuation of application No. PCT/CN2006/001254, filed on Jun. 8, 2006.

(30) Foreign Application Priority Data

Sep. 8, 2005  (CN) .......................... 2005 1 0098470

(51) Int. Cl.
G06F 15/173 (2006.01)
H04N 7/167 (2006.01)
(52) U.S. Cl. .................. 709/224; 709/223; 380/227
(58) Field of Classification Search .............. 705/50–52, 705/77–79; 709/223–225; 380/227–230; 702/127, 179, 182, 186–187
See application file for complete search history.

(56) References Cited

U.S. PATENT DOCUMENTS

| | | | | |
|---|---|---|---|---|
| 6,021,429 | A * | 2/2000 | Danknick | 709/208 |
| 6,442,144 | B1 * | 8/2002 | Hansen et al. | 370/255 |
| 6,496,859 | B2 * | 12/2002 | Roy et al. | 709/223 |
| 6,892,199 | B2 * | 5/2005 | Hong et al. | 707/7 |
| 6,982,953 | B1 * | 1/2006 | Swales | 370/218 |
| 7,020,085 | B2 * | 3/2006 | Mimura et al. | 370/235 |
| 7,031,288 | B2 * | 4/2006 | Ogier | 370/338 |

(Continued)

FOREIGN PATENT DOCUMENTS

CN  1561078 A  1/2005

(Continued)

OTHER PUBLICATIONS

International Telecommuniocations Union. "Next Generation Network Standards to be Defined at ITU." [Retreived online on Aug. 25, 2009] May 6, 2005 [Retreived online] <URL: http://www.itu.int/newsarchive/press_releases/2004/05.html>.*

(Continued)

*Primary Examiner* — Joseph Avellino
*Assistant Examiner* — James Baron
(74) *Attorney, Agent, or Firm* — Leydig, Voit & Mayer, Ltd.

(57) ABSTRACT

A method for making statistics of media flow information may include: sending a request for making statistics of media flow information to a BGF; and receiving statistic information of the media flow from the BGF, wherein the statistic information of the media flow is metered by the BGF after receiving the request for making statistics of media flow information A system and a BGF are also disclosed in embodiments of the present invention. In the present invention, the accurate metering ability of the BGF is employed to acquire accurate statistic information of the media flow, thereby accurate service charging may be implemented and service charging based on used network resources amount and QoS may be supported. Furthermore, the statistic information of the media flow, such as start time, end time, flow count information and statistic information of actual QoS, may help operation and maintenance of the network.

15 Claims, 1 Drawing Sheet

U.S. PATENT DOCUMENTS

| | | | |
|---|---|---|---|
| 7,539,150 B2 * | 5/2009 | Lauer et al. | 370/254 |
| 7,917,637 B2 * | 3/2011 | Li et al. | 709/228 |
| 2001/0021176 A1 * | 9/2001 | Mimura et al. | 370/235 |
| 2002/0132617 A1 * | 9/2002 | Nuss et al. | 455/422 |
| 2002/0166002 A1 * | 11/2002 | Milner et al. | 710/8 |
| 2003/0120773 A1 | 6/2003 | Mueller et al. | |
| 2003/0163583 A1 * | 8/2003 | Tarr | 709/245 |
| 2003/0232615 A1 * | 12/2003 | Kim et al. | 455/405 |
| 2004/0034492 A1 * | 2/2004 | Conway | 702/81 |
| 2004/0148237 A1 * | 7/2004 | Bittmann et al. | 705/35 |
| 2004/0170163 A1 | 9/2004 | Yik et al. | |
| 2004/0203435 A1 * | 10/2004 | Karlquist et al. | 455/67.11 |
| 2004/0235449 A1 * | 11/2004 | Noel, Jr. | 455/405 |
| 2004/0236547 A1 * | 11/2004 | Rappaport et al. | 703/2 |
| 2005/0094572 A1 * | 5/2005 | Mimura et al. | 370/252 |
| 2005/0128946 A1 | 6/2005 | Murakami et al. | |
| 2005/0198262 A1 * | 9/2005 | Barry et al. | 709/224 |
| 2006/0083252 A1 * | 4/2006 | Sakuraba et al. | 370/400 |
| 2006/0251129 A1 * | 11/2006 | Morimura et al. | 370/503 |
| 2006/0268921 A1 * | 11/2006 | Ekstrom et al. | 370/437 |

FOREIGN PATENT DOCUMENTS

| | | |
|---|---|---|
| JP | 2001-274794 A | 10/2001 |
| JP | 2003-244238 A | 8/2003 |
| WO | WO 02/28013 A2 | 4/2002 |
| WO | WO 2007/028299 A1 | 3/2007 |

OTHER PUBLICATIONS

Dickerson, K. R. "Standards as and enabler for next generation networks." [Retreived online on Aug. 25, 2009] Apr. 2004 [Retreived from the Internet] <URL: http://www.springerlink.com/content/w133w447026894n15/fulltext.pdf>.*

Farhang et al., *Bell Labs Technical Journal*, 9(1): 31-40 (May 2004).

Tham et al., *International Journal of Network Management*, 10: 75-90 (Apr. 2000).

Van der Merwe et al., *Computer Communication Review*, 30(5): 48-59 (Oct. 2000).

European Telecommunications Standards Institute (ETSI), "Telecommunication and internet converged services and protocols for advanced networking (TISPAN); NGN functional architecture Release 1" ETSI Standard ES 282 001 V1.1.1 (Aug. 2005).

International Telecommunication Union, "General overview of NGN," ITU-T Recommendation Y.2001 (Dec. 2004).

State Intellectual Property Office of the People's Republic of China, Official Action in Patent Application No. 2005100984707 (Dec. 7, 2007).

Written Opinion of the International Searching Authority in corresponding PCT Application No. PCT/CN2006/001254 (Oct. 19, 2006).

1st Office Action in corresponding European Application No. 06742140.4 (Apr. 25, 2008).

1st Office Action in corresponding Chinese Application No. 200680011919.4 (Jan. 9, 2009).

Tham et al., "Monitoring QoS distribution in multimedia networks," International Journal of Network Management, 2000, John Wiley & Sons, Ltd, Singapore.

"Draft ETSI ES 2XX XXX—NGN Functional Architecture; Resource and Admission Control Subsystem (RACS); Release 1," Jul. 2005, Version 1.6.2, ETSI, Sophia Antipolis Cedex.

"3GPP TS 29.207—3rd Generation Partnership Project; Technical Specification Group Core Network and Terminals; Policy control over Go interface (Release 6)," Jun. 2005, Version 6.4.0, 3rd Generation Partnership Project, Valbonne, France.

"3GPP TS 29.209—3rd Generation Partnership Project; Technical Specification Group Core Network and Terminals; Policy control over Gq interface (Release 6)," Jun. 2005, Version 6.3.0, 3rd Generation Partnership Project, Valbonne, France.

Liu et al., "Revision 5 of TR-RACF," 7th Focus Group on Next Generation Networks meeting, Jun. 27-Jul. 1, 2005, International Telecommunication Union, Beijing, China.

Yavatkar et al., "RFC 2753—A Framework for Policy-based Admission Control," Jan. 2000, Internet Society, Reston, Virginia.

* cited by examiner

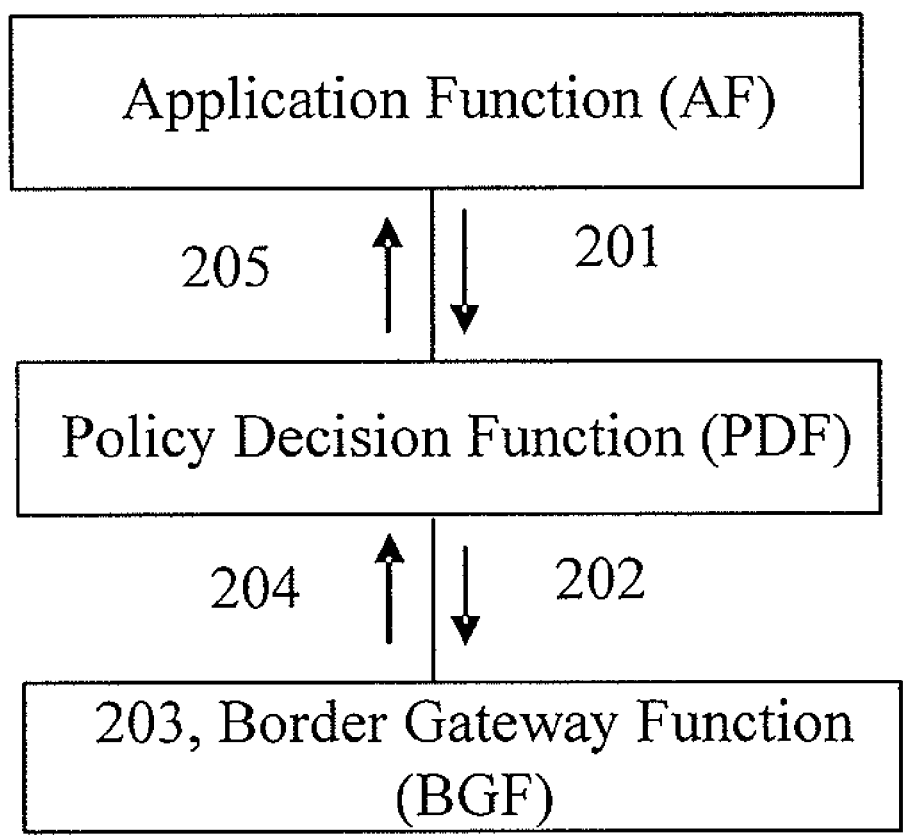

METHOD AND SYSTEM FOR MAKING STATISTICS OF MEDIA FLOW INFORMATION IN A NEXT GENERATION NETWORK

This application is a continuation of International Patent Application No. PCT/CN2006/001254, filed Jun. 8, 2006, which claims priority to Chinese Patent Application No. 200510098470.7, filed Sep. 8, 2005, all of which are hereby incorporated by reference.

FIELD OF THE TECHNOLOGY

The present invention relates to network communication technologies, and particularly, to a method and a system for making statistics of media flow information as well as a Border Gateway Function (BGF) in a Next Generation Network (NGN).

BACKGROUND OF THE INVENTION

One primary feature of the NGN is a separation between a service layer and a transport layer. The transport layer is based on packet and optical technologies and the service layer provides various multimedia services. An NGN functional architecture includes the service layer with a core of an IP Multimedia Subsystem (IMS) and the Internet Protocol (IP) based transport layer.

The service layer of an NON includes various IP application servers and service control subsystems, such as an IP multimedia subsystem, a Public Switch Telephone Network (PSTN)/Integrated Service Digital Network (ISDN) Emulation subsystem. Under the control of a Network Attachment Sub-system (NASS) and a Resource and Admission Control Sub-system (RACS), the transport layer of the NON provides IP connectivity between NGN terminals and hides the transport technology underlying an IP layer of access and core networks, implementing the separation and interaction between the service layer and the transport layer.

Various gateway functional entities, including Border Gateway Function (BGF), Media Gateway Function (MGF) and Signaling Gateway Function (SGF) of the transport layer, have abilities to interact with the service layer.

The BGF provides interfaces between two IP transport domains, and may be located at the border of a home network of a user, an access network or a core network. The BGF may provide the following functions:

gates opening/closing (the so called gate is to filter a message according to the IP address/port);
packet marking of outgoing stream;
resource allocation and bandwidth reservation of upstream/downstream;
allocation and conversion of IP addresses and ports;
remote Network Address Translation (NAT) traversal;
policing the incoming stream;
IP address anti-spoofing;
usage metering;
interworking between Internet Protocol version 4 (IPv4) networks and Internet Protocol version 6 (IPv6) networks; and
hiding topology.

One or more of the above function can be controlled through interactions between the BGF and a Resource and Admission Control Function (RACF) of the RACS.

The Usage Metering function refers to statistic reporting of accurate statistic information of a media flow. The media flow metering is mainly used for operation, maintenance and charging in the NGN.

However, the current drafts of the NGN standards does not specify metering information or metering method for media flows, that is, specific information of the media flow metering, issues on how to perform a media flow metering, how to control the metering and how to acquire and use the metering information remain to be addressed.

SUMMARY OF THE INVENTION

An embodiment of the present invention provides a method and a system for making statistics of media flow information in a NGN, as well as a BGF, to enable statistics of the media flow information in the NGN.

A method for making statistics of media flow information in a NGN in accordance with an embodiment of the present invention may include:

sending a request for making statistics of media flow information to a BGF; and receiving statistic information of the media flow from the BGF, wherein the statistic information of the media flow is metered by the BGF after receiving the request for making statistics of media flow information.

A system for making statistics of media flow information in an NGN in accordance with an embodiment of the present invention may include:

an Application Function (AF), for sending a request for making statistics of media flow information for a media flow and receiving statistic information of the media flow; and a BGF, for making statistics of the media flow information according to the request for making statistics of the media flow information and sending the statistic information of the media flow.

A BGF, comprising a means for receiving a request for making statistics of media flow information for a media flow, and making statistics of the media flow information according to the request for making statistics of the media flow information and sending the statistic information of the media flow.

As above, certain embodiments of the present invention employs the accurate metering ability for media flow of a BGF to implement accurate service charging and support service charging based on used network resources amount and QoS.

Furthermore, certain embodiments of the present invention, media flow statistic information, such as start time, end time, flow count information, statistic information of actual QoS, have ability to help the operation and maintenance of the network, such as stream based network capacity planning and network performance monitoring.

BRIEF DESCRIPTION OF THE DRAWINGS

FIG. 1 is an exemplary flow chart of the method in accordance with an embodiment of the present invention.

DETAILED DESCRIPTION OF THE INVENTION

Detailed description of the present invention will be hereinafter given with reference to the accompanying drawings and embodiments.

A method for making statistics of media flow information in an NGN provided in an embodiment of the present invention may include such aspects as determining which kind of information of media flows should be metered, how to perform a metering, how to control a metering and how to acquire and use the statistic information. By using the method provided by an embodiment of the present invention, an NGN operator may acquire accurate statistic information of each media flow according to actual requirements, thereby may improve charging accuracy of an IP multimedia service and support the charging based oil used resources amount and QoS.

In the embodiment, an AF initiates a request for making statistics of media flow information for media flow information, and a BGF makes accurate statistics of media flow information and return the statistic information of the media flow to the AF. Subsequently, the AF performs such processing as charging, operation managing, and network maintenance according to the statistic information.

FIG. 1 shows an exemplary flow chart of the method in accordance with an embodiment of the present invention. The method may include these steps:

Step 201: the AF sends a request for making statistics of media flow information for a media flow to a Policy Decision Function (PDF).

In this step, when a session for a multimedia service is established, the AF determines that a resource admission control is needed for the session, the AF sends to the PDF the request with an identifier of the media flow and a resource reservation request which includes metering requirements of accurately metering the media flow of the session and reporting the statistic information.

Step 202: the PDF sends the request for making statistics of the media flow information for the media flow to a BGF.

In this step, the PDF performs an authentication and an admission to the resource reservation request. If the resource reservation request passes an admission rule, the PDF may send to the BGF the identifier of the media flow, the resource reservation request and the metering requirements.

Step 203: the BGF makes statistics of the media flow information upon receiving the request for making statistics of the media flow information for the media flows.

In this step, according to the received resource reservation request, the BGF opens a gate, i.e. allows the media flow to pass through the BGF, and performs an accurate metering of the media flow.

A BGF has a Gate Control function and is a necessary path for a media flow of an IP multimedia service, so the BGF is capable of accurately recording the statistic information of the media flow. In addition, media flows are transported based on the Real-time Transport Protocol (RTP) and the RTP packet header carries such information as Time Stamp. Thus according to the metering requirements, the BGF may accurately record the start time, end time and flow count information by detecting the RTP packet, wherein the flow count information refers to the number of packets of the media flow.

Furthermore, because Real-time Transport Control Protocol (RTCP) is a protocol for controlling RTP packets, an RTCP packet includes the QoS information, such as number of packet loss, the accumulative sent packets and delay, thus according to the metering requirements, the BGF may also collect and record actual QoS statistic information of the media flow, such as jitter, delay, packet loss rate, etc.

Step 204: the BGF reports the statistic information of the media flow to the PDF when the session is over.

In this step, when the session is over, upon receiving a resource release request, the BGF releases the reserved resource, closes the gate, i.e. blocks the media flow, and sends to the PDF resource release confirmation information and reports the statistic information of the media flow.

Step 205: the PDF sends the statistic information of the media flow to the AF.

Specifically, the PDF sends the resource release confirmation information and the statistic information of the media flow to the AF.

As such, the AF may acquire accurate statistic information of the media flow and implement accurate service charging using the statistic information of the media flow, including the start time, the end time and the flow count information of the media flow.

Also, the AF may support service charging which is based on the used network resources amount and QoS using the actual QoS statistic information of the media flow.

Services in the NGN are independent of networks, and such softswitch device as the AF is responsible for processing signaling flows, controlling services and charging services. The media flow interactions are performed by Media Gateways rather than the AF. Due to diversity of the IP media services, it is possible that no media flow interworking is implemented after the signaling flows are set up. Therefore, it is difficult for the AF to perform accurate service charging and prevent resources from being embezzled only by the processing the signaling flows. In certain embodiments of the present invention described above, the accurate metering ability of the BGF is employed to acquire accurate statistic information of a media flow, thereby implementing accurate service charging and supporting service charging based on used network resources amount and QoS.

In addition, using the BGF to acquire statistic information of a media flow, such as start time, end time, flow count information, and statistic information of actual QoS, may help operation and maintenance of a network, for example, stream based network capacity planning and network performance monitoring.

Embodiments of the present invention also disclose a system for making statistics of media flow information in a NON, the system may include an AF and a BGF. The AF is adapted to send a request for making statistics of media flow information for a media flow to the BGF and receive statistic information of the media flow from the BGF. The BGF is adapted to make statistics of the media flow information according to the request for making statistics of the media flow information and send the statistic information of the media flow to the AF. The system may also include a PDF. When the AF send to the BGF a request for making statistics of media flow information for the media flow, the AF may send a message carrying an identifier of the media flow, a resource reservation request and the request for making statistics of the media flow information to the PDF, and the PDF may send the identifier of the media flow, the resource reservation request and the request for making statistics of the media flow information to the BGF.

When making statistics of media flow information for a media flow, the implementation performed by the system may be similar to the procedure described above. Detailed descriptions of the structures and functions of the system, the AF and the BGF, as well as the PDF will be apparent to a skilled person.

Though the present invention has been illustrated and described by some preferred embodiments, those skilled in the art should understand that various changes may be made in form and detail without departing from the spirit and the scope of the present invention and therefore should be covered in the protection scope of the present invention defined by the appended claims and its equivalents.

What is claimed is:

1. A method for making statistics of media flow information in a Next Generation Network (NGN), comprising:

receiving, by a Policy Decision Function (PDF), a request for making statistics of media flow information of a media flow with an identifier of the media flow and a resource reservation request from an Application Function (AF) in the NGN, wherein the NGN comprises a service layer with a core of an Internet Protocol Multimedia Subsystem (IMS) and an Internet Protocol (IP) based transport layer, wherein the resource reservation request comprises metering requirements of metering the media flow and reporting the statistic information;

sending, by the PDF, the request for making statistics of the media flow information to a Border Gateway Function (BGF) if the resource reservation request passes an admission rule;

receiving, by the PDF, statistic information of the media flow in the NGN from the BGF, wherein the statistic information of the media flow is metered by the BGF after receiving the request for making statistics of media flow information; and sending, by the PDF, the statistic information of the media flow to the AF.

2. The method of claim 1, wherein
the sending the request for making statistics of the media flow information to a Border Gateway Function (BGF) if the resource reservation request passes an admission rule comprises:
authenticating, by the PDF, the resource reservation request; and
sending, by the PDF, the identifier of the media flow, the resource reservation request and the metering requirement to the BGF if the authentication succeeds.

3. The method of claim 1, wherein receiving the statistic information of the media flow from the BGF comprises:
receiving, by the PDF, the statistic information of the media flow from the BGF when a session corresponding to the media flow is over; and
the statistic information of the media flow is metered by the BGF by detecting a Real-time Transport Protocol (RTP) packet, or a Real-time Transport Control Protocol (RTCP) packet, or an RTP packet and an RTCP packet after receiving the request for making statistics of media flow information.

4. The method of claim 3, wherein the statistic information of the media flow comprises at least one of a start time of the media flow, an end time of the media flow, number of packets of the media flow, and quality of service (QoS) information of the media flow.

5. The method of claim 4, wherein the QoS information of the media flow comprises at least one of jitter, delay, and packet loss rate of the media flow.

6. The method of claim 3, wherein metering the statistic information of the media flow by the BGF by detecting the RTP packet, or the RTCP packet, or the RTP packet and the RTCP packet by the BGF comprises:
upon receiving the resource reservation request, allowing the media flow to pass through and metering the statistic information of the media flow by detecting the RTP packet, or the RTCP packet, or the RTP packet and the RTCP packet by the BGF; and
upon receiving a resource release request, blocking the media flow by the BGF.

7. The method of claim 3, wherein receiving the statistic information of the media flow from the BGF when the session corresponding to the media flow is over comprises:

receiving, by the PDF, resource release confirmation information and the statistic information of the media flow from the BGF upon receiving the resource release request;
wherein sending the statistic information of the media flow to the AF comprises:
sending, by the PDF, the resource release confirmation information and the statistic information of the media flow to the AF.

8. The method of claim 3, wherein the RTP packet comprises Time Stamp information.

9. The method of claim 3, wherein the RTCP packet comprises at least one of packet loss rate, accumulative sent packets, and delay.

10. A system for making statistics of media flow information in a Next Generation Network (NGN), wherein functional architecture of the NGN comprises a service layer with a core of an Internet Protocol Multimedia Subsystem (IMS) and an Internet Protocol (IP) based transport layer, the system comprising:
an Application Function (AF), for sending a request for making statistics of media flow information of a media flow with an identifier of the media flow and a resource reservation request for a media flow and receiving statistic information of the media flow, wherein the resource reservation request comprises metering requirements of metering the media flow and reporting the statistic information;
a Policy Decision Function (PDF), for receiving the request for making statistics of media flow information from the AF; sending the request for making statistics of media flow information to a Border Gateway Function (BGF) if the resource reservation request passes an admission rule; receiving statistic information of the media flow from the BGF; and sending the statistic information of the media flow received from the BGF to the AF; and
a Border Gateway Function (BGF), for receiving the request for making statistics of media flow information from the PDF; making statistics of the media flow information according to the request for making statistics of the media flow information and sending the statistic information of the media flow to the PDF.

11. The method of claim 1, before the AF sending a request for making statistics of media flow information to the PDF, the method further comprising:
determining, by the AF, a resource admission control is needed for a session when the session for a multimedia service is established.

12. The system of claim 10, wherein the PDF is further for performing an authentication and an admission to the resource reservation request.

13. The system of claim 10, wherein the AF is further for determining, a resource admission control is needed for a session when the session for a multimedia service is established before the AF sending the request for making statistics of media flow information to the PDF.

14. A Policy Decision Function (PDF), comprising:
a processor configured to implement a method comprising:
receiving a request for making statistics of media flow information of a media flow with an identifier of the media flow and a resource reservation request from an Application Function (AF) in the NGN, wherein the NGN comprises a service layer with a core of an Internet Protocol Multimedia Subsystem (IMS) and an Internet Protocol (IP) based transport layer, wherein the resource reservation request comprises metering requirements of metering the media flow and reporting the statistic information;

sending the request for making statistics of the media flow information to a Border Gateway Function (BGF) if the resource reservation request passes an admission rule;

receiving statistic information of the media flow in the NGN from the BGF, wherein the statistic information of the media flow is metered by the BGF after receiving the request for making statistics of media flow information; and sending the statistic information of the media flow to the AF.

15. The PDF of claim 14, wherein the method implemented by the processor further comprising:

authenticating the resource reservation request; wherein the resource reservation request includes metering requirement of metering the media flow and reporting the statistic information.

* * * * *